March 12, 1968  O. M. ARNOLD ETAL  3,372,811
ROTATING DRUM FILTER APPARATUS
Filed April 16, 1964  5 Sheets-Sheet 1

INVENTORS.
ORLAN M. ARNOLD
FREDERICK W. KOEPKE, JR.
HENRY J. LASLO
SARK PASHAIAN
JAMES M. STEWART
EMIL UMBRICHT
BY Curtis, Morris & Safford
ATTORNEYS INVENTORS.
ORLAN M. ARNOLD
FREDERICK W. KOEPKE, JR.
HENRY J. LASLO
SARK PASHAIAN
JAMES M. STEWART
EMIL UMBRICHT Curtis, Morris & Safford
ATTORNEYS

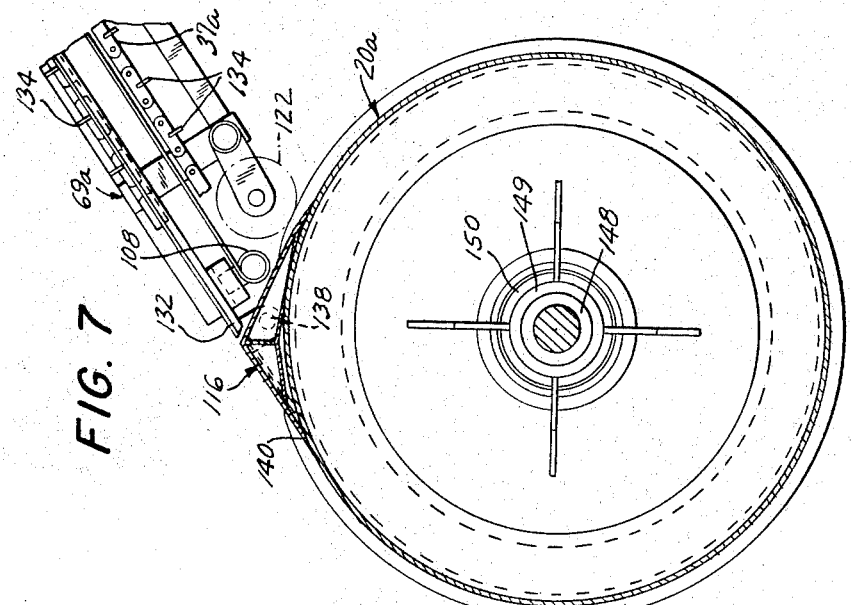
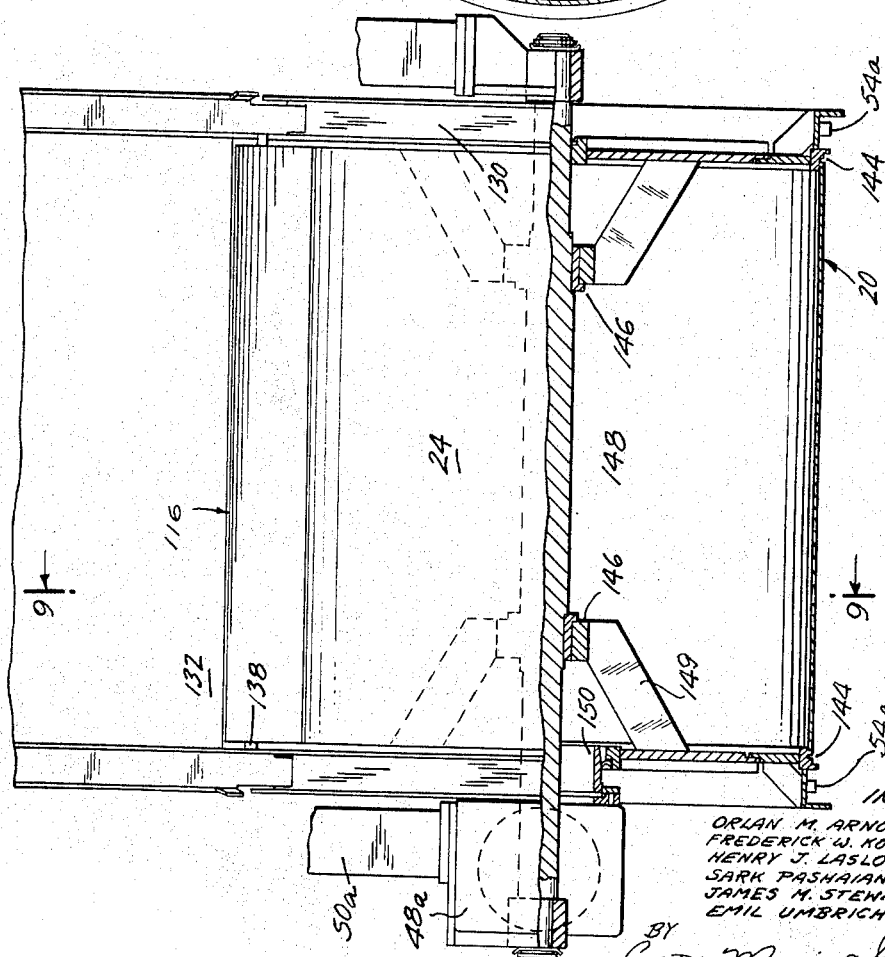

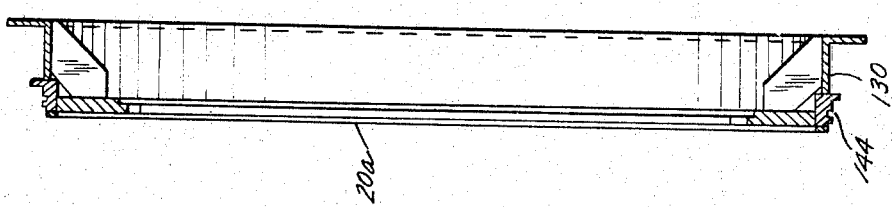
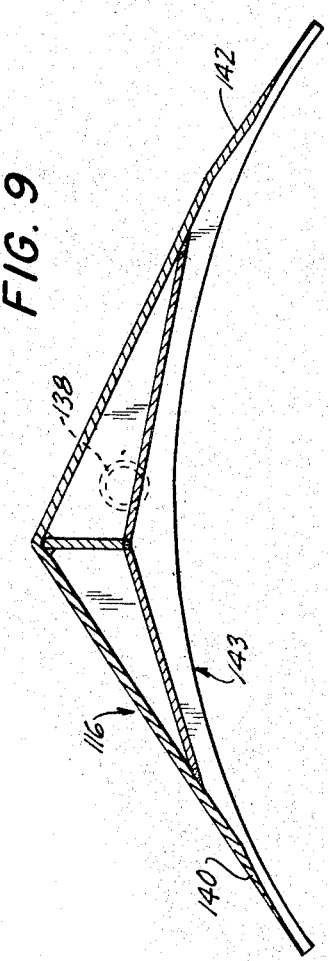
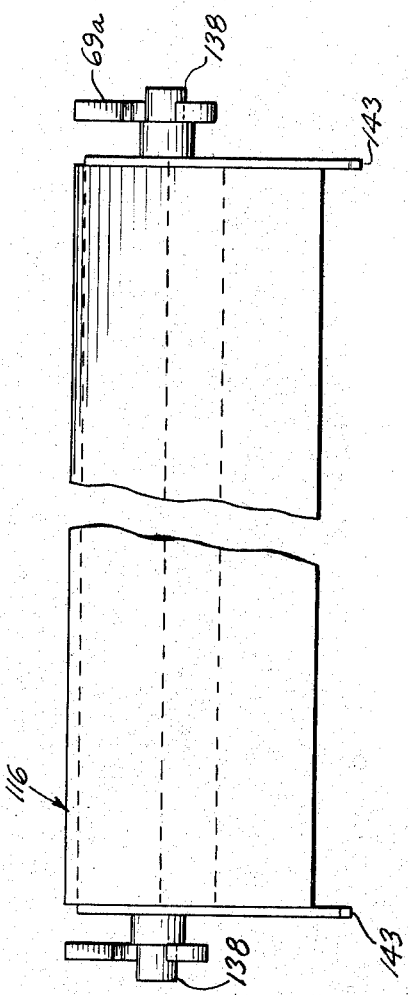

United States Patent Office 3,372,811
Patented Mar. 12, 1968

3,372,811
ROTATING DRUM FILTER APPARATUS
Orlan M. Arnold, Grosse Pointe Park, Frederick W. Koepke, Jr., Detroit, Sark Pashaian, Monroe, James M. Stewart, Dearborn, Emil Umbricht, Northville, and Henry Joseph Laslo, Detroit, Mich., assignors to Ajem Laboratories, Inc., Livonia, Mich.
Filed Apr. 16, 1964, Ser. No. 364,352
4 Claims. (Cl. 210—387)

ABSTRACT OF THE DISCLOSURE

A rotatable filter drum having a pervious filter face and a hollow hub. Suction is applied to the interior of the drum through the hub and liquid is filtered through the filter face. An arcuate wall, stationary relative to rotations of the filter drum, is positioned to seal off that portion of the pervious face which at any time is exposed above the level of the liquid being filtered.

---

This invention relates to filtration apparatus and more particularly to filtration apparatus comprising rotating drum filtering means having high capacity and novel sealing means.

Filtration equipment that can be operated as nearly to continuously as possible is important. For example, in many industrial processing situations, it is undesirable to discard liquids used in the process after a single use. This is sometimes because of direct economic considerations, for example when the liquid is a relatively expensive cooling oil contaminated by dirt, and sometimes because of more indirect considerations, for example the desire to avoid a capital expenditure for more water supply lines or the necessity of conserving water induced by restricted local supply, or the necessity of avoiding pollution by discharging wastes.

In such continuous filtration operations, it is important to have a filter that may be operated as long as possible without excessive down-time for cleaning, advancing new filter medium, etc. Unless such down-time can be avoided, it may be necessary, during the filter-shut-down periods, to shut down also the processing operation to which the filtered liquid is being recycled, or to provide an auxiliary filtration unit, or to provide a storage unit maintaining a reservoir of pre-filtered liquid. These methods of mitigating the effects of non-continuous filtration require increased capital investment for greater plant floor space and for the addition of equipment involved. Furthermore, frequent shutting down and starting up of suction pumps cause excessive wear on the pumps. Thus, it is important to have trouble-free continuous filtration equipment capable of smooth operation and capable of continuously supplying filtered fluid for various processes.

An object of this invention is to provide filtration apparatus having improved liquid sealing means. Another object of the invention is to provide apparatus having a high degree of cooperation between elements thus allowing simplicity of structure. It is another object of the invention to provide filtration apparatus having a high capacity for handling both liquid to be cleaned and sludge and dirt separated from said liquid by the filtering action.

It is a further object of the invention to provide apparatus requiring relatively little down-time for maintenance such as cleaning, etc.

The apparatus of the instant invention achieves the objects set forth above. Applicants' apparatus comprises a drum filter rotatably mounted in a tank for holding dirty liquid. Advantageously a sludge conveyor is placed in the tank below the drum filter and tank side walls are sloped towards the sludge conveyor. Filter medium is fed, e.g. from a roll of clean medium around a hold-down roll, which brings the medium into contact with the face of the filter drum. This contact is normaly made above the surface of the dirty liquid. The filter media are then carried around the filter drum, by rotation of the drum, and guided onto a continuous carrier which carries the dirty media to a disposal area.

For most efficient operation, the major moving parts of the apparatus, i.e. the dirty medium carrier, the hold-down drum, the filter drum itself, and the sludge conveyor are all interlocked, i.e. operationally connected, to provide synchronous movement. This is advantageously arranged by having gear-type teeth on the drum and hold-down rolls, or on wheels connected to the rolls, etc. These teeth engage a sprocket-type chain or similar teeth on drive gears, etc. For example a roller-type chain on the sludge conveyor can engage teeth (or in notches) on the drum and thus cause the sludge conveyor to advance as the drum turns. The same teeth of the drum can be used to turn the medium hold-down roll, etc.

The drum and media conveyor assembly are advantageously pivotally mounted to swing out of the dirty liquid, providing easy access for maintenance. To facilitate the removal of the drum, ducts through which filtered fluid is carried from the inner portion of the drum through the tank of dirty liquid are adapted for quick disconnection. This is advantageously carried out by having substantially horizontal flanged connections of these ducts that are gasketed with a resilient material. Gate valves utilizing a slide plate may be provided to close off the ducts when the assembly is swung up from them.

It is also advantageous to provide means for sealing that portion of the filter drum face that is not below the surface of the dirty liquid from the suction means which is ordinarily used to remove clean liquid from the inside of the filter drum. This is advantageously accomplished by having a stationary sealing member mounted within the drum. This sealing member does not rotate but is fixed, for example, on the non-rotating shaft on which the drum is supported. The sealing member has extremities reaching below the liquid level maintained inside the drum and thereby provides an air-tight seal.

Another advantageous feature that may be incorporated into the apparatus is the use of continuous loops of resilient material to bear against the edges of the filter medium on the drum. Such loops may be continuous, one on each edge, and may be looped over the drum and a roll, for example on the filter medium conveyor. In some applications, it is desirable to have these loops held down by small hold-down rolls mounted proximate to the periphery of the drum around which the hold-down belts may also be looped.

A resilient cleaning means such as plastic teeth, brushes or a pivoted scraper is conveniently mounted adjacent to the sludge conveyor to aid the cleaning of the conveyor and the disposal of accumulated sediment without troublesome engagement with cleats mounted on the sludge conveyor.

Another unique device useful as a sealing member is a cap seal which, in addition to providing a seal, can help guide the filter medium on and off of the filter drum.

The filter medium normally pass across a permanent metal screen support or other perforated metal base which covers the circumferential area of the drum. Both filter medium and metal support may be chosen from materials known to the art which provide suitable filtration of the particular solids being processed.

In the drawings:

FIGURE 7 is a cross-sectional view taken on line 9—9 of FIGURE 8 and on an enlarged scale as compared with FIGURES 1 and 2, and showing a unique liquid seal feature and part of the medium-carrying equipment.

FIGURE 8 is a view, partly in elevation and partly in section, of the filter drum shown in FIGURE 1.

FIGURE 9 is a fragmentary vertical section through the seal assembly shown in FIGURE 7.

FIGURE 10 is a front elevation of the seal assembly, partially broken away.

FIGURE 11 is a fragmentary cross-section taken through a filter drum.

Figure 1:
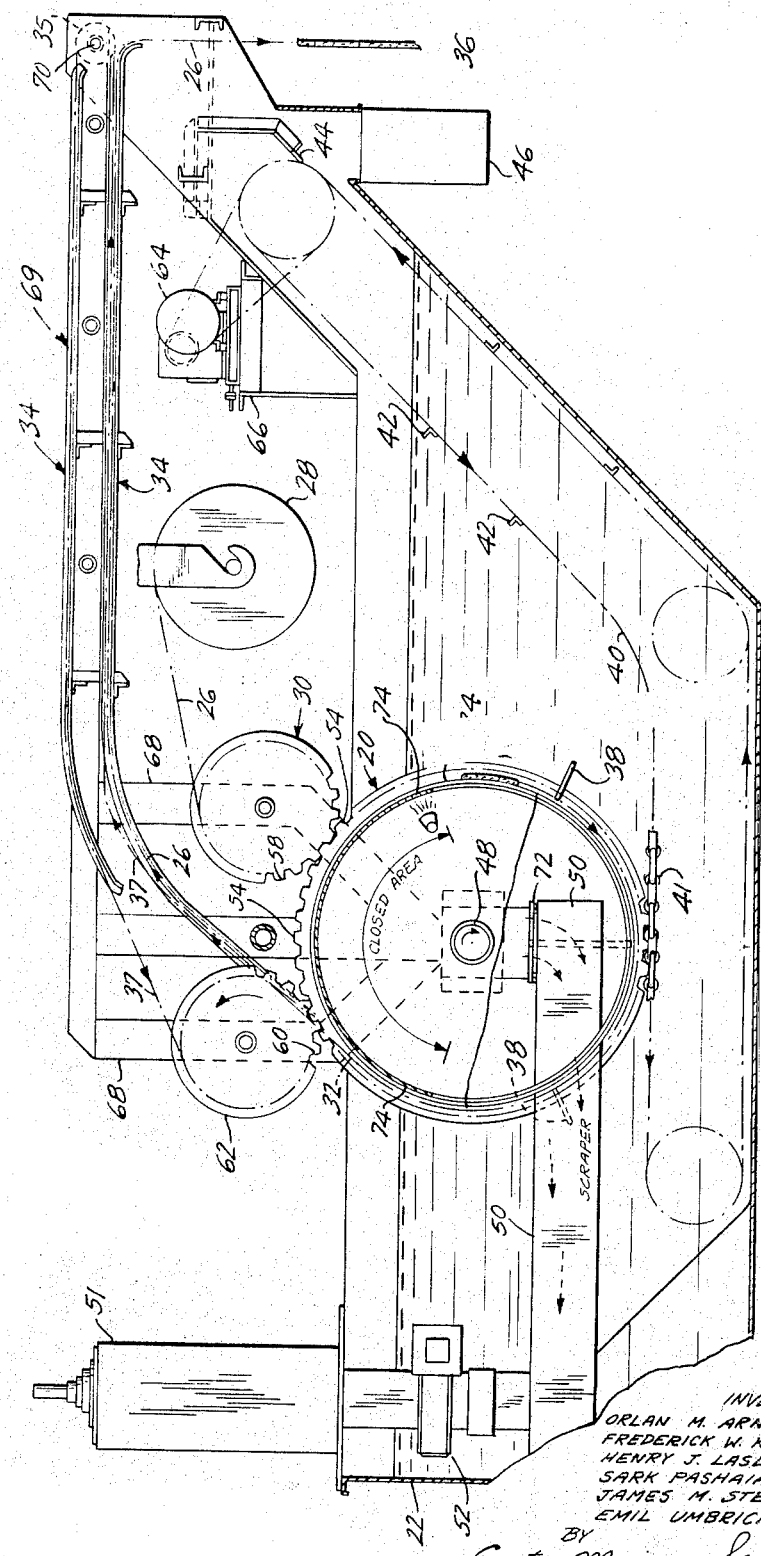
FIGURE 1 is a side elevational view of a filter apparatus with a side wall broken away to expose interior parts.
Figure 3:
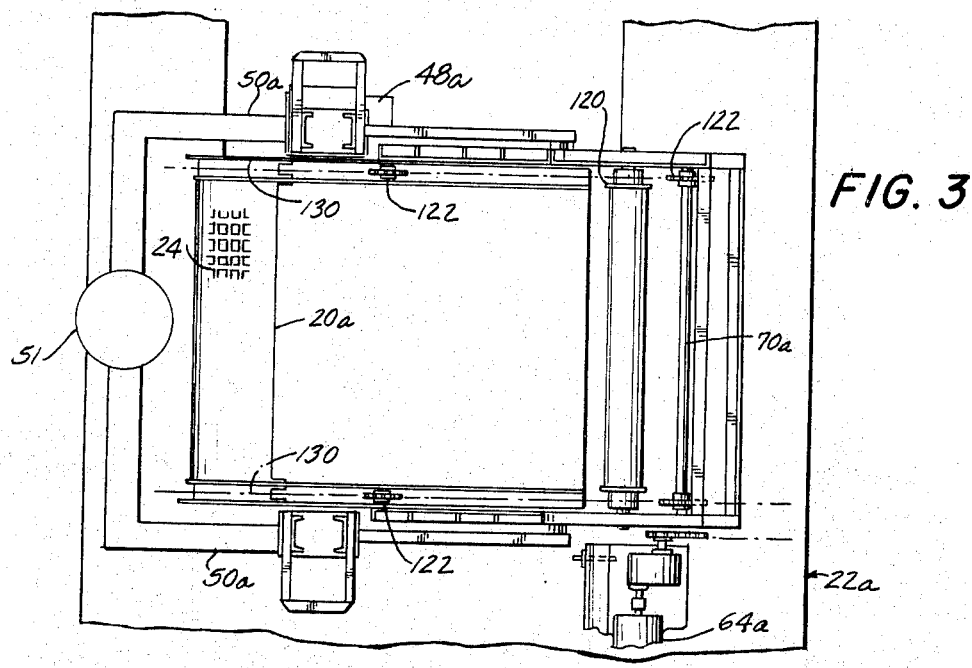
FIGURE 3 is a fragmentary plan view of the apparatus shown in FIGURE 2.
Figure 2:
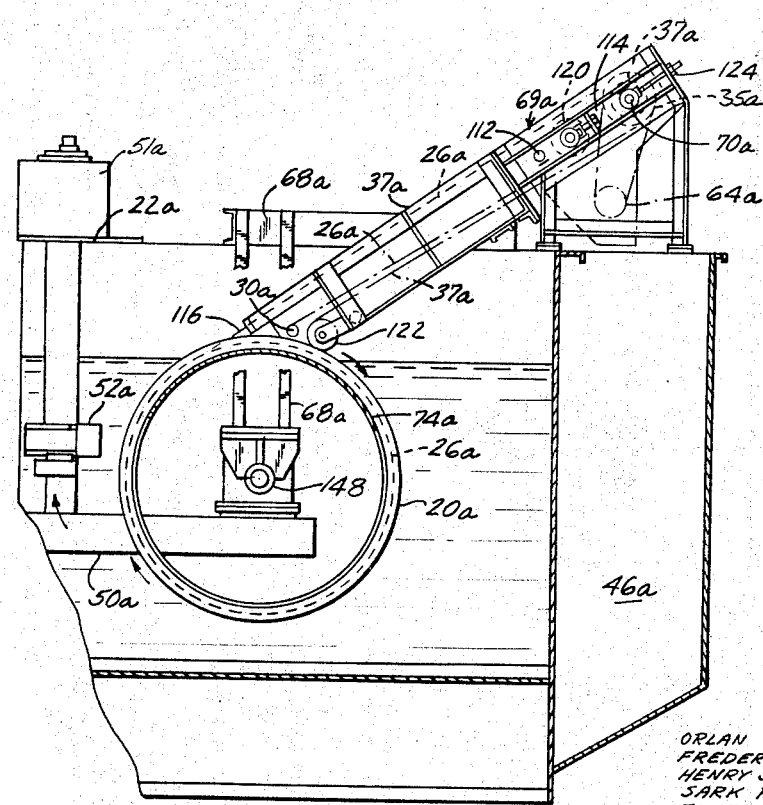
FIGURE 2 is an elevational view like that of FIGURE 1 of a filter apparatus with the filter strip removed and, again, with the side wall broken away, and parts of the frame, to show the operating parts.

Referring to FIGURE 1, a filter drum 20 is positioned in a tank 22 for holding a mass of dirty liquid. The drum has a pervious filter face 24 (as shown on the embodiment of FIGURE 4) on which filter medium 26 is fed from supply roll 28 and around a hold-down roll 30.

Filter medium 26 moves with drum 20 in clockwise direction and is carried off the drum at position 32 wherefrom it is dragged over the lower tray of media conveyor 34 to disposal area 36 by conveyor chains and sprocket drive 35.

Scrapers 38 are placed adjacent the drum in order to remove as much filter cake as possible from the filter while it is still in tank 22. The sludge, or filter cake, thus removed by scrapers 38 drops off of drum 20, falls onto sludge conveyor 40, having sprocket chains 41 at the sides and cleat 42 secured across said chains whereby to drive the sludge along the bottom and up the sloped end of tank 22 to the flexible plastic teeth of sludge ejector 44 where it falls or is scraped into disposal box 46.

The liquid is continuously pulled from the dirty liquid tank 22 into the filter drum 20 through the filter medium 26 and thence through the tubular hubs 48 of the drum and connected ducts 50. Suction necessary for thus pulling the liquid is provided by pump 52 driven by motor (not shown) through a shaft supported by frame 51.

All moving parts of the filter apparatus proper, i.e. drum 20, sludge conveyor 40 and media conveyor 34, are synchronously operated by means of gear teeth or sprockets 54 on the outside of the filter drum 20, which mesh with roller chains 41 of sludge conveyor 40 and also with gears 58 and 60 on hold-down roll 30 and take-off roll 62, respectively. The prime mover is motor 64 mounted on stand 66. It drives the sludge scraper belt 40, and through it the drum 20 and the medium conveyor 30, 62 and 35.

Drum 20 and the filter medium conveyor means are mounted on a frame 68, to constitute a unit 69 pivoted at 70; it may be conveniently swung up out of the dirty liquid for maintenance purposes. This removal is greatly facilitated by making the drum and filter medium conveyor etc. as a unit with its own frame 68 pivoted at 70 to the tank or a fixed frame. Simple pressure seals 72, gasketed with resilient material, provide a positive seal against liquid leakage when weight of apparatus on frame 68 is allowed to rest on them and no other fastening means is necessary, thus facilitating the swinging up of unit 69 for servicing, etc.

An arcuate wall 74 is positioned inside the drum 20 close to its pervious peripheral wall and secured to the frame so that it does not rotate with the drum. This sealing wall 74 has its both extremities below the surface of the dirty liquid, and thus prevents the suction in the drum from being broken where the top of the drum is out of the liquid.

An embodiment of the invention having a continuous, i.e. re-cycled, filter strip is shown in FIGURES 2 to 11. A filter medium conveyor and drive assembly unit 69a is provided with meshing drive chains 37a and gear teeth 54a (shown in FIGURE 4) at the edge of filter drum 20a, as described above, to allow synchronous motion of the conveyor assembly 69a and the drum 20a.

Filter medium is carried on the periphery of drum 20a around to filter medium conveyor assembly 69a.

Hold-down roll 30a is used to hold the filter medium close against the drum 20a.

Figure 4:
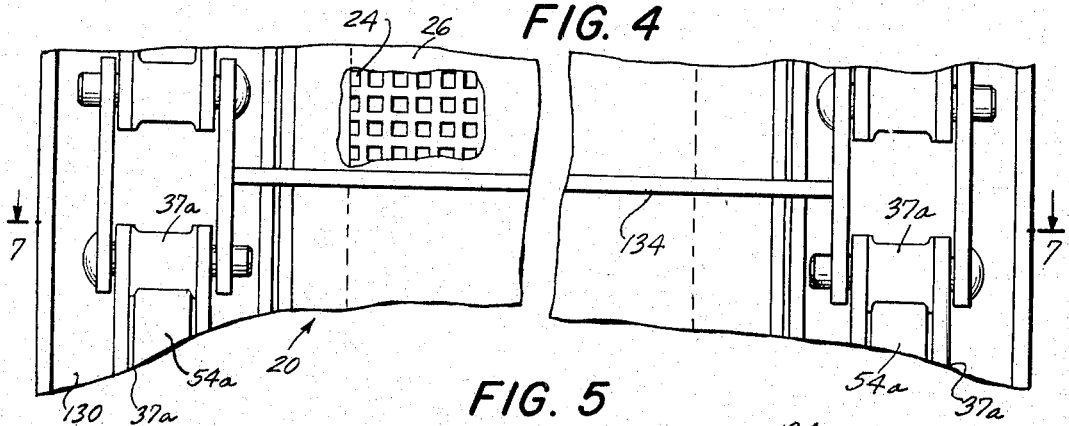
FIGURE 4 is a fragmentary side elevation of a filter drum showing only portions of opposite ends of the drum with the chains in position. The other portions are broken away in this figure.
Figure 5:
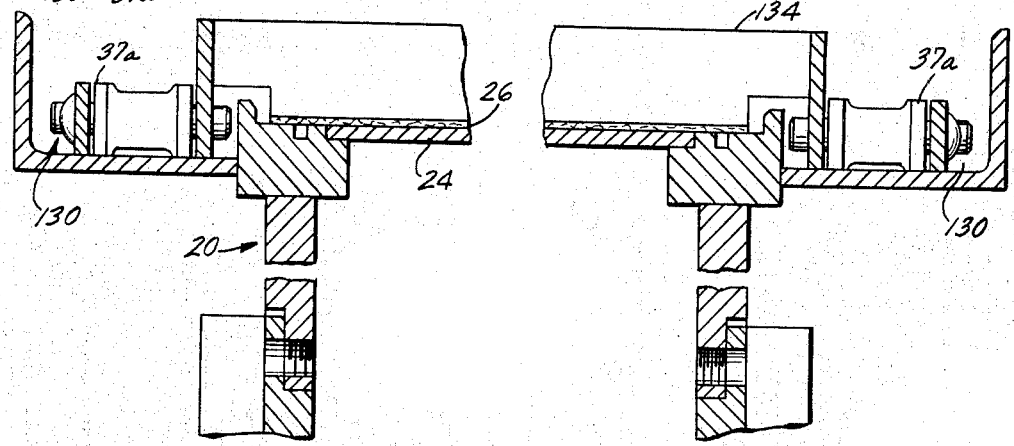
FIGURE 5 is a view in fragmentary cross-section taken on line 7—7 of FIGURE 4, showing the chain and belt carried on outer diameter of the filter drum.
Figure 6:
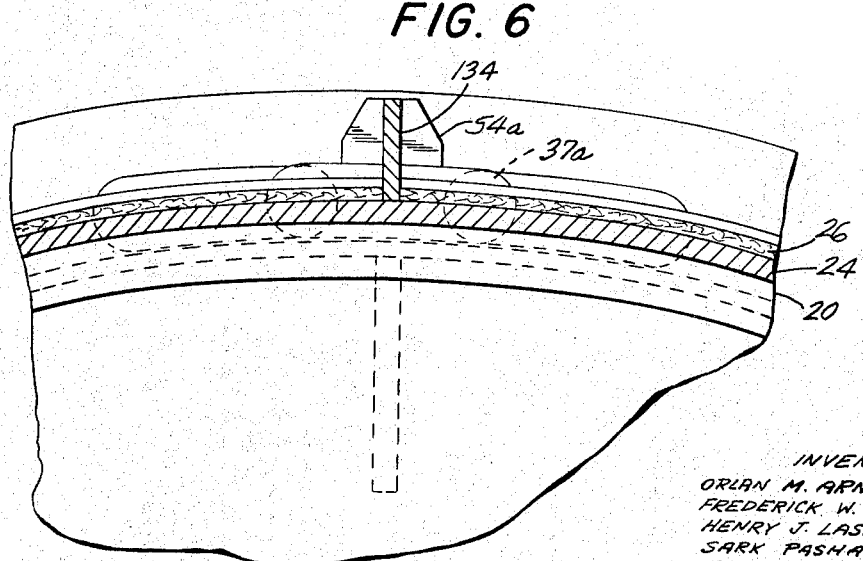
FIGURE 6 is a fragmentary vertical section of the filter drum showing the position of the chains.

FIGURES 4, 5 and 6 indicate the position of roller chains 37a and teeth 54a on the filter drum which provide an operative driving connection between the conveyor assembly 69a and the drum 20a.

Air nozzles 112 are provided for blowing dirt from the filter strip. A belt-tension adjusting device 114, and a prime mover and drive mechanism 64a for the filter medium conveyor assembly 69a are shown on FIGURE 2.

A filter strip take-off guide and seal 116 is provided which lifts and guides the filter medium off from the filter drum onto the conveyor assembly 69a.

The roller chain and sprocket drive 37a moves over idler sprockets 122 (shown diagramically on FIGURES 2 and 7), and then passes on around the sprocket ring 54a on drum 20a.

The continuous belt filter medium moves around roll 120, back to idler roll 30a, around drum 20a, up along to roll 120. Roll 120 has an adjusting device 114 to provide an independent tension adjustment to the filter cloth.

The air nozzles 112 provide means to remove at least some of the filter cake as the filter medium passes over roll 120. Air supplied to nozzle 112 may be controlled by an automatic valve means responsive to movement of the filter medium or a part connected to it, so as to be actuated only when the filter medium is moving.

FIGURES 4, 5 and 6 show, with enlarged detail, the drum and conveyor assembly. Chains 37a ride in channels 130 at opposite ends of drum 20a. Sprocket teeth 54a, as shown in FIGURES 4 and 6, project from the drum between rollers of chain 37a to engage the chain. Cross bars 134 connect the chains across the drum and serve for dragging the used filter medium and the soil up and along the inclined filter medium support sheet 132 (see FIGURE 7) to the end roll at 70.

FIGURES 7, 9 and 10 show a novel pivoted ramp seal 116 mounted as a "floating" cap on the top of the filter drum. This seal 116 is mounted on the frame of the conveyor unit 69a by pivots 138 and comprises guide sections 140 and 142 upon which the filter medium is better transferred to and from the drum 20a. The ends 143 of this seal cap 116 have their arcuate bottom edges engaged in grooves 144, seen on FIGURES 8 and 11. The fit in grooves 144 is only close enough to allow a very small amount of liquid to pass, which lubricates the member 143 in the groove 144. This cap seal 136 is loosely mounted with respect to vertical movement, on pivots 138 so that it will press both feet 140 and 142 against the drum, but is overbalanced on the side of 140 so that the lead-on ramp will more tightly engage the drum face. This cap may be fabricated advantageously from metal or other stiff, resilient sheet material.

Referring to FIGURE 8, it is seen that drum 20a is rotatably supported by bearings 146 on stationary shaft 148 supported on spider 149 as shown in FIGURE 8. Also seen in FIGURE 8 are the teeth 54a that are adapted to engage roller chain 37a; but the chain is not shown in this figure.

In the operation of the embodiment shown in FIGURES 2 to 11, the filter medium belt 26a is fitted over the drum 20a around the tension idler roll 120, over the lead-on roll 30a, the drum 20a and back over the ramp 140 of the cap seal 116 and thence back to the tension roll 120. As the filter drum 20a slowly rotates immersed in the dirty liquid in tank 22a, the soil is filtered from the liquid and remains on the filter medium 26a while the purified liquid passes on into the interior of the drum 20a, out through the hollow trunnion 150 and hub 48a and duct 50a to the suction pump. As the filter medium 26a passes on around the drum, a deposit of soil is built up until it comes to the ramp 140, where the filter medium is stripped off the surface of the drum, passes up along the ramp and onto the support sheet 132 along which it is dragged by the cross bars 134 of the chain conveyor 37a until it reaches the roll 120. At this point the filter medium passes around the roll while the chain conveyor and its cross bars pass on to the outer sprocket of 37a. As the filter medium passes around the roll 120, any thick deposits, or "filter cake," break and drop off into the ludge disposel box 46a. As the filter medium passes beyond the roll 120, nozzles 112 blow and shake residual deposits down into the box 46a. The filter medium thus cleaned is returned to the drum and reused in the same manner.

If the filter medium is of sufficiently high tensile strength, e.g. with nylon or glass fiber or other continuous filament high tensile fiber extending lengthwise of the strip, the filter medium can be used without a carrier such as the chains and cross bars 134; but in general it is preferable to use the carrier and a cheaper disposable filter strip. With a strong filter cloth such as nylon, the strip may be made with transverse pockets into which cross bars such as 134 are filled. This helps to hold the strip to full width over the drum face and also makes for a better conveyor action.

In this application and accompanying drawings, we have shown and described preferred embodiments of our invention and have suggested various alternatives and modifications thereof, but it is to be understood that these are not intended to be exhaustive and that other changes and modifications can be made within the scope of the invention. These suggestions herein are selected and included for purposes of illustration in order that others skilled in the art will more fully understand the invention and the principles thereof and will be enabled to modify it and embody it in a variety of forms, each as may be best suited to the condition of a particular case.

We claim:

1. A filter apparatus adapted for use in a tank holding a mass of liquid to be filtered which comprises a rotatably mounted filter drum having a pervious face for filtration, a duct for clean liquid communicating with the interior of said filter drum, means for creating suction in said duct, a strip of filter medium over said pervious face and arranged for passage thereover, an impervious stationary arcuate seal member mounted in close proximity to said pervious face and extending at each end of its arc beneath the level of liquid being filtered and being fitted to the sides of said drum in substantially liquid tight connection, a conveyor for said filter medium operatively connected to said filter drum through a chain drive means which are synchronously driving the filter drum, advancing the filter medium and are provided with means to remove accumulated sludge from the tank, and means for bringing the filter medium flush with said pervious face.

2. A filter apparatus adapted for use in a tank holding a mass of liquid to be filtered which comprises a rotatably mounted filter drum having a pervious face for filtration, a duct for filtered liquid communicating with the interior of said filter drum, means for creating suction in said duct, a strip of filter medium over said pervious face and arranged for passage thereover, an impervious stationary arcuate seal member mounted within said drum and extending at each end of its arc beneath the level of liquid and being fitted to the sides of said drum in substantially liquid tight connection, a filter media conveyor operatively connected to said filter drum, a driving means operatively connected to said conveyor, said operative connection being in the form of a chain between said conveyor and said drum providing for synchronous movement of said drum and said conveyor, said chain being provided with means to remove sludge accumulating in said tank.

3. A filter apparatus adapted for use in a tank holding a mass of liquid to be filtered which comprises a frame member, a rotatably mounted filter drum having a pervious face for filtration and having around the sides thereof a channel assembly and teeth therein, said drum also having grooves at the sides of its periphery, an impervious seal member pivotally mounted on said frame and having arcuate edges adapted to fit said grooves, a duct for filtered liquid communicating with the interior of said filter drum, a suction-creating means in said duct, a strip of filter medium arranged for passage over said pervious face, a filter medium conveyor operatively connected to said drum, said operative connection between said conveyor and said drum providing for synchronous movement of said drum and said conveyor, the said drum being driven by a chain means engaging the teeth of said drum and providing said synchronous movement, said chain being provided with means to remove sludge from said tank by a scraping action and said seal member further having sloping guide members adapted to aid the transfer of said filter medium to and from said drum.

4. Filtration apparatus comprising:
   a tank for holding a mass of liquid to be filtered;
   a support frame pivotally mounted relative to said tank;
   a rotatably mounted filter drum having a pervious filter face on the peripheral surface thereof and a hollow hub in a sidewall thereof, the axis of rotation of said filter drum being fixed to said support frame for movement with said support frame;
   an impervious arcuate wall secured to said support frame and fixed in position relative to rotational movements of said filter drum, said arcuate wall being located in close proximity to said pervious filter face and having an arc length extending over that portion of said pervious filter face above the liquid level in said tank, said arcuate wall being fitted to the sides of said drum in substantially liquid tight connection;
   means defining a liquid passage arranged to communicate with said hub when said filter drum is positioned within said tank for filtration of said liquid;
   sealing means between adjoining ends of said hub and said liquid passage;
   suction means communicating with said liquid passage for drawing clean liquid through said pervious face, said hub and said liquid passage;
   a strip of filter media extending over a substantial length of said pervious face;

filter medium conveying means secured to said support frame for bringing said filter medium flush with said pervious face and for drawing said filter medium away from said filter drum;

scraping means for scraping sludge accumulating on said filter medium off of said filter media;

a sludge conveyor in said tank and operatively connected to said filter drum;

and means for pivotally moving said support frame to move said filter drum and said arcuate wall into and out of said tank.

References Cited

UNITED STATES PATENTS

| | | | |
|---|---|---|---|
| 736,596 | 8/1903 | Grondahl | 210—401 X |
| 775,475 | 11/1904 | Mehnert et al. | 210—401 |
| 1,451,522 | 4/1923 | Baxter | 210—402 X |
| 1,797,248 | 3/1931 | Szegnari et al. | 210—387 X |
| 2,823,806 | 2/1958 | Harlan | 210—387 |
| 2,916,145 | 12/1959 | Kaiser | 210—401 |
| 3,206,030 | 9/1965 | Estabrook | 210—387 X |

SAMIH N. ZAHARNA, *Primary Examiner.*